(12) United States Patent
Wright et al.

(10) Patent No.: US 8,392,057 B2
(45) Date of Patent: Mar. 5, 2013

(54) HYBRID POWERTRAIN DIAGNOSTICS

(75) Inventors: John F. Wright, Columbus, IN (US); Vivek A. Sujan, Columbus, IN (US); Morgan M. Andreae, Columbus, IN (US)

(73) Assignee: Cummins Inc., Columbus, IN (US)

( * ) Notice: Subject to any disclaimer, the term of this patent is extended or adjusted under 35 U.S.C. 154(b) by 109 days.

(21) Appl. No.: 12/642,884

(22) Filed: Dec. 21, 2009

(65) Prior Publication Data
US 2011/0153128 A1    Jun. 23, 2011

(51) Int. Cl.
*G01M 17/00* (2006.01)
(52) U.S. Cl. ...................... 701/31.7
(58) Field of Classification Search ............ 701/51, 701/54–55, 31.7
See application file for complete search history.

(56) References Cited

U.S. PATENT DOCUMENTS

| | | | |
|---|---|---|---|
| 4,169,372 A | | 10/1979 | Colwill et al. |
| 5,809,843 A | * | 9/1998 | Barger et al. .............. 74/574.4 |
| 5,881,559 A | | 3/1999 | Kawamura |
| 6,494,277 B1 | | 12/2002 | Boggs et al. |
| 6,510,370 B1 | | 1/2003 | Suzuki et al. |
| 6,553,958 B1 | | 4/2003 | Kolmanovsky et al. |
| 6,616,569 B2 | | 9/2003 | Hoang et al. |
| 6,768,938 B2 | | 7/2004 | McBrien et al. |
| 6,784,563 B2 | | 8/2004 | Nada |
| 6,845,305 B1 | | 1/2005 | Raftari et al. |
| 7,071,656 B2 | | 7/2006 | Taniguchi |
| 7,111,611 B1 | | 9/2006 | Lyon |
| 7,116,068 B2 | | 10/2006 | Boesch et al. |
| 7,203,578 B2 | | 4/2007 | Kuang et al. |
| 7,275,518 B1 | | 10/2007 | Gartner et al. |
| 7,290,525 B1 | | 11/2007 | Kapsokavathis et al. |
| 7,294,991 B2 | | 11/2007 | Kimura et al. |
| 7,739,016 B2 | * | 6/2010 | Morris ............................. 701/51 |
| 7,758,468 B2 | * | 7/2010 | Vafidis et al. .................. 477/115 |
| 7,765,857 B2 | * | 8/2010 | Suzuki ........................ 73/114.04 |
| 7,803,086 B2 | * | 9/2010 | Tabata et al. ........................ 477/3 |
| 7,891,450 B2 | * | 2/2011 | Soliman et al. .......... 180/65.265 |
| 2007/0101965 A1 | * | 5/2007 | Asahara et al. ............ 123/192.1 |
| 2007/0225886 A1 | | 9/2007 | Morris |
| 2008/0210509 A1 | | 9/2008 | Fenkart et al. |
| 2009/0118990 A1 | * | 5/2009 | Suzuki .......................... 701/111 |

FOREIGN PATENT DOCUMENTS

GB    2 358 845 A    8/2001

OTHER PUBLICATIONS

International Preliminary Report on Patentability, PCT/US2010/061456, Cummins Inc., Jun. 26, 2012, The International Bureau of WIPO.

* cited by examiner

*Primary Examiner* — Hussein A. Elchanti
(74) *Attorney, Agent, or Firm* — Krieg DeVault LLP

(57) ABSTRACT

Some exemplary embodiments include methods of operating a hybrid powertrain system including an engine and a motor/generator. One exemplary method includes sensing a characteristic of the motor/generator, determining a first net torque of the engine based upon a model, determining a second net torque of the engine based upon the characteristic of the motor/generator, and diagnosing the system based upon the first net torque and the second net torque. Further exemplary embodiments include hybrid powertrain methods, hybrid powertrain systems, and articles of manufacture configured to store computer executable instructions for hybrid powertrains. Further embodiments, forms, objects, features, advantages, aspects, and benefits shall become apparent from the following description and drawings.

28 Claims, 4 Drawing Sheets

HYBRID POWERTRAIN DIAGNOSTICS

BACKGROUND

Hybrid powertrains including one or more internal combustion engines and one or more motor/generators can be used to provide motive power to vehicles. Such hybrid powertrains offer the potential for multiple advantages including reduced fuel consumption, reduced pollution and emissions, and greater operational flexibility among others. The advantages of hybrid systems have been limited by the significantly more complicated to control and diagnostic problems which they present. Present approaches to controls and diagnostics for hybrid powertrains suffer from a number of drawbacks, limitations, disadvantages and problems. There is a need for the unique and inventive hybrid powertrain diagnostics and controls disclosed herein.

SUMMARY

Some exemplary embodiments include methods of operating a hybrid powertrain system including an engine and a motor/generator. One exemplary method includes sensing a characteristic of the motor/generator, determining a first net torque of the engine based upon a model, determining a second net torque of the engine based upon the characteristic of the motor/generator, and diagnosing the system based upon the first net torque and the second net torque. Further exemplary embodiments include hybrid powertrain methods, hybrid powertrain systems, and articles of manufacture configured to store computer executable instructions for hybrid powertrains. Further embodiments, forms, objects, features, advantages, aspects, and benefits shall become apparent from the following description and drawings.

DETAILED DESCRIPTION

For the purposes of clearly, concisely and exactly describing exemplary embodiments of the invention, the manner and process of making and using the same, and to enable the practice, making and use of the same, reference will now be made to the exemplary embodiments illustrated in the figures and specific language will be used to describe the same. It shall nevertheless be understood that no limitation of the scope of the invention is thereby created, and that the invention includes and protects such alterations and modifications to the exemplary embodiments, and such further applications of the exemplary embodiments as would occur to one skilled in the art to which the invention relates.

Figure 1:
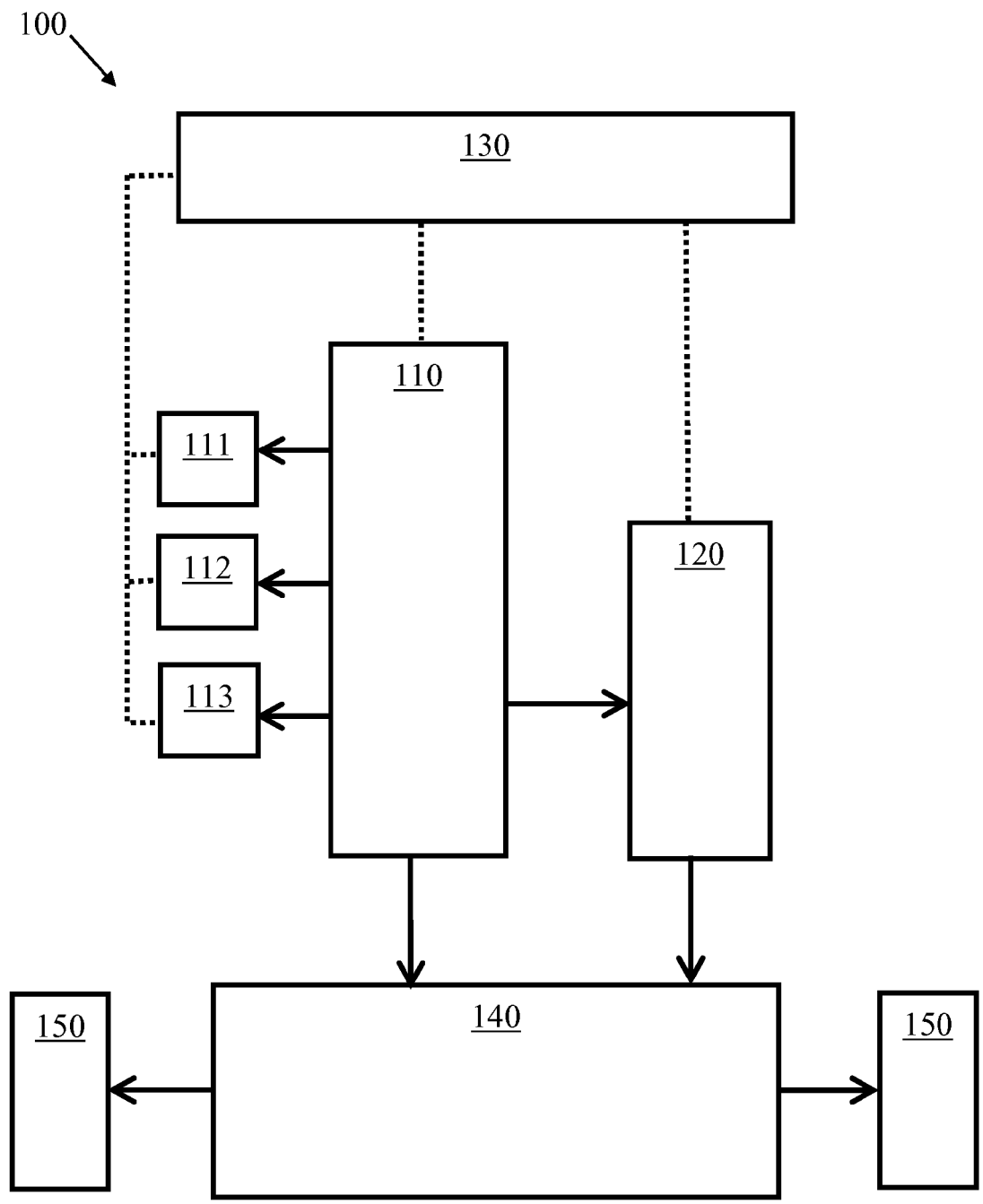
FIG. 1 is a schematic diagram illustrating an exemplary hybrid powertrain system.

With reference to FIG. 1 there is illustrated an exemplary hybrid powertrain system 100 which can provide operative or motive power for vehicle such as a passenger car, truck, bus, off-highway vehicle, construction vehicle, mining vehicle, train, ship or other type of vehicle. Hybrid powertrain system 100 includes internal combustion engine 110 and motor/generator 120. As illustrated in FIG. 1, engine 110 and motor/generator 120 are configured in a series-parallel relationship examples of which include a power split hybrid configuration and a combined hybrid configuration. In other embodiments engine 110 and motor/generator 120 are configured in a series relationship. In an exemplary series configuration engine 110 drives motor/generator 120 which outputs electrical power which can be stored and/or used to provide motive power for a vehicle. In other embodiments engine 110 and motor/generator 120 are configured in a parallel relationship. In an exemplary parallel configuration engine 110 and motor/generator 120 are selectably operable to power a vehicle powertrain alone or in combination.

As illustrated in FIG. 1, engine 110 and motor/generator 120 can operate in multiple modes to output torque to differential 140 which, in turn outputs torque to wheels 150. In some modes of operation, the net torque output from engine 110 is delivered to motor/generator 120. In other modes of operation, the net torque output from engine 110 is delivered to differential 140. In other modes of operation, engine 110 delivers a portion of its net torque to motor/generator 120 and a portion of its net torque output to differential 140. Engine 110 is also selectably operable to drive compressor 111, fan 112, and other engine accessories 113 which can include, for example, alternator(s), additional compressor(s), additional fan(s) and other engine accessories.

System 100 includes a control module 130 which is operable to control the operation of system 100. Control module 130 is coupled with a number of communication links, examples of which are illustrated as dashed lines, for sending and receiving signals or information to and from other components of system 100, including engine 110, motor/generator 120, compressor 111, fan 112, and other engine accessories 113.

Control module 130 is operable to determine a net torque of engine 110 based upon a fueling information input to a model. In one embodiment the model determines gross torque based upon fueling information, and determines a net torque by accounting for friction losses, pumping losses, cam losses, accessory losses and parasitics. Some embodiments utilize models which account for additional or alternate factors. As used herein net torque refers to a torque available to provide power to a powertrain. One definition of net torque is the torque at the main engine output shaft, sometimes referred to as brake torque. Other definitions include the torque at other locations such as the flywheel or driveplate. Still other definitions account for frictional and other losses present after engine output. Unless indicated otherwise, net torque includes these and other definitions of torque which connote the torque available to provide power to a powertrain regardless of the particular point at which such torque is defined or measured and regardless of the particular losses which are accounted for.

Control module 130 is operable to determine the net toque of engine 110 based upon one or more characteristics of motor/generator 120. In series modes of operation the net torque of engine 110 is delivered to motor/generator 120 and engine net torque can be determined based upon one or more electrical characteristics of motor/generator 120. In some embodiments net torque is determined in accordance with the relationship $\tau=k*I*V/\omega$, where $\tau$ is torque, k is a constant, I is a generator current, V is a generator voltage, and $\omega$ is the angular velocity of the generator. In some embodiments $2\pi*n$ where n is the rotational speed can be used instead of $\omega$. In some embodiments k may be selected to account for powertrain losses or other system losses. In some embodiments engine net torque is determined in accordance with the relationship $\tau=kI^2*R/\omega$, where $\tau$ is torque, k is a constant, I is a motor/generator current, R is motor/generator resistance, and $\omega$ is the angular velocity of the generator. In some embodiments engine net torque is determined in accordance with non-linear equations which account for second or higher order effects, for example, the non-linear elastic shaft behavior (stress-strain deformations) that would accompany any shaft undergoing a torque, non-linear perturbations or oscillations, non-linear electromagnetic behavior of the electric motor system, engine torque oscillations due to firing order and uneven cylinder torque, and others.

Engine net torque can be determined based upon characteristics of a motor/generator regardless of the mode of system operation or system configuration. In some embodiments generator acceleration, for example generator shaft acceleration, is measured at an rate effective to provide indicia of engine firing events. This rate permits engine net torque to be determined from shaft acceleration and system inertia in both series and non-series operation and in both series and non-series system configurations. In some embodiments the rate is about every two shaft revolutions. In some embodiments the rate is about every shaft revolution. In some embodiments the resolution is about a fraction of a shaft revolution, for example, a half, a third, a fourth, a fifth, a sixth or another fraction. In some embodiments engine net torque is determined in accordance with the relationship $T=T_1+J*d\omega/dt$ where T is the instantaneous value of the developed motor torque, $T_1$ is the instantaneous value of the load torque, w is the instantaneous angular velocity of the motor shaft, and J is the moment of inertia of the motor-load system. In some embodiments engine net torque is determined in accordance with non-linear equations which account for second or higher order effects such as those described above.

In some embodiments engine net torque can be determined based upon one or more electrical characteristics of a motor/generator regardless of the mode of system operation or system configuration by operating a motor/generator to smooth torque pulsations which result from engine firing events. In some embodiments, a reciprocating piston engine generates torque pulses each time one of its cylinders fires and the engine net torque output includes pulses attributable to the firing events. A motor/generator is operatively coupled with the engine mechanical, electrical, or a combination of electrical and mechanical depending upon the system configuration. The motor/generator operates to smooth the torque pulses and smooth the engine net torque output. In an exemplary embodiment the motor/generator smoothes torque pulsations by increasing and decreasing its load on the engine to smooth the torque pulsations. This can be accomplished, for example, by charging and discharging a capacitor, supercapacitor, ultracapacitor, piezoelectric device or another device operable to store and release energy at a rate on the order of the torque pulses. The variation of motor/generator load to smooth torque pulsations is matched to expected torque pulsations based upon a model which can account for variables such as fueling, engine speed and other information relating to engine characteristics. Over or under correction of torque pulses results in a vibration of the system which can be sensed. In some embodiments amplitude and frequency of the torque pulses can be sensed. The amplitude and frequency of the vibration can be used to diagnose particular system malfunctions or errors. An electrical characteristic of the motor/generator can also be used to determine the net torque of the engine. This net torque can be used in combination with the vibration amplitude and frequency information to diagnose particular system malfunctions or errors. A difference between this net torque and a modeled net torque can also be used in combination with the vibration amplitude and frequency information to diagnose particular system malfunctions or errors.

Figure 2:
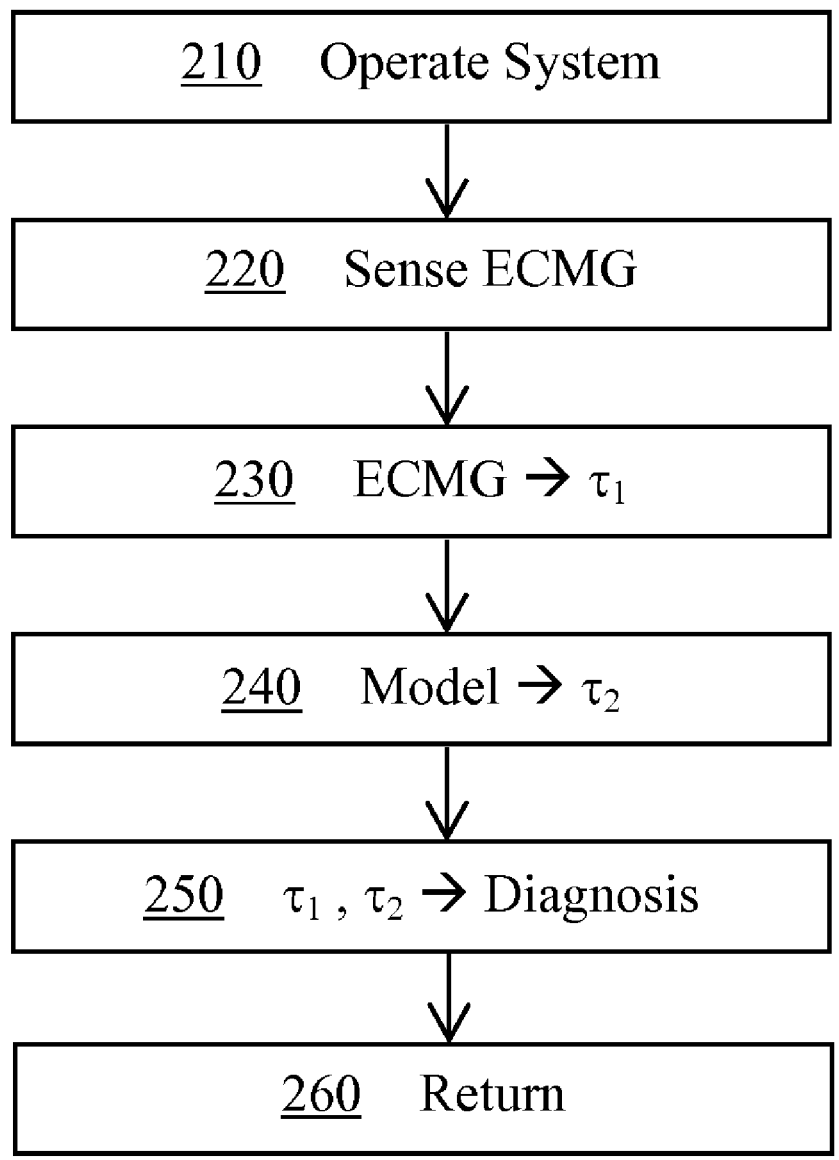
FIG. 2 is a flowchart illustrating an exemplary process.

With reference to FIG. 2 there is illustrated a flowchart according to an exemplary diagnostic process 200 which includes multiple operations that can be performed by a controller such as ECM 130 described above or one or more additional or alternate controllers.

Operation 210 operates a hybrid powertrain system including one or more engine(s) and one or more motor/generator(s). The hybrid powertrain system may be system 100 described above or another hybrid powertrain system. The hybrid powertrain system may have a series configuration, a parallel configuration or a series/parallel configuration, and may operate in a series mode of operation, a parallel mode of operation, a series/parallel mode of operation or may vary among such modes of operation. From operation 210 process 200 proceeds to operation 220.

Operation 220 senses one or more electrical characteristics of a motor/generator of the hybrid powertrain system. Some embodiments sense one or more of the electrical characteristics described above. Some embodiments sense other electrical characteristics. From operation 220 process 200 proceeds to operation 230.

Operation 230 uses one or more sensed electrical characteristics of the motor/generator to determine a first net torque of the engine of the hybrid powertrain system. Some embodiments determine a first net torque of the engine based upon one or more relationships described above. Some embodiments determine a first net torque of the engine based upon other relationships. From operation 230 process 200 proceeds to operation 240.

Operation 240 uses a model to determine a second net torque of the engine of the hybrid powertrain system. Some embodiments determine gross torque based upon fueling information, and determine net torque by accounting for friction losses, pumping losses, cam losses, accessory losses and parasitics. Some embodiments utilize models which account for additional or alternate factors, for example, turbocharger information, engine speed information and others. In the illustrated example operation 240 is performed after operation 230. In other embodiments operation 240 is performed before operation 220, in parallel with operation 220, before operation 230, in parallel with operation 230. From operation 240 process 200 proceeds to operation 250.

Operation 250 diagnoses the system based upon the first net torque and the second net torque. Some embodiments diagnose the system using additional information, for example, vibration characteristics such as those discussed above. Some embodiments include a two dimensional look up table which includes first net torque values on a first axis, second net torque values on a second axis, and specifies diagnostic conditions for table entries. Some embodiments include look up tables with greater or fewer numbers of axes, for example, a single axis of differences between the first torque values and the second torque values rather than separate axes for first net torque values and second net torque values. As used herein diagnosing, diagnostic(s), diagnosis and like terms include diagnosing current operational states, malfunctions, failures, and/or other conditions as well as future prognostics of such conditions. From operation 250 process 200 proceeds to operation 260 where process 200 returns to operation 210, returns to another operation of process 200, or ends. Operation 260 may also call for another process to be performed.

Figure 3:
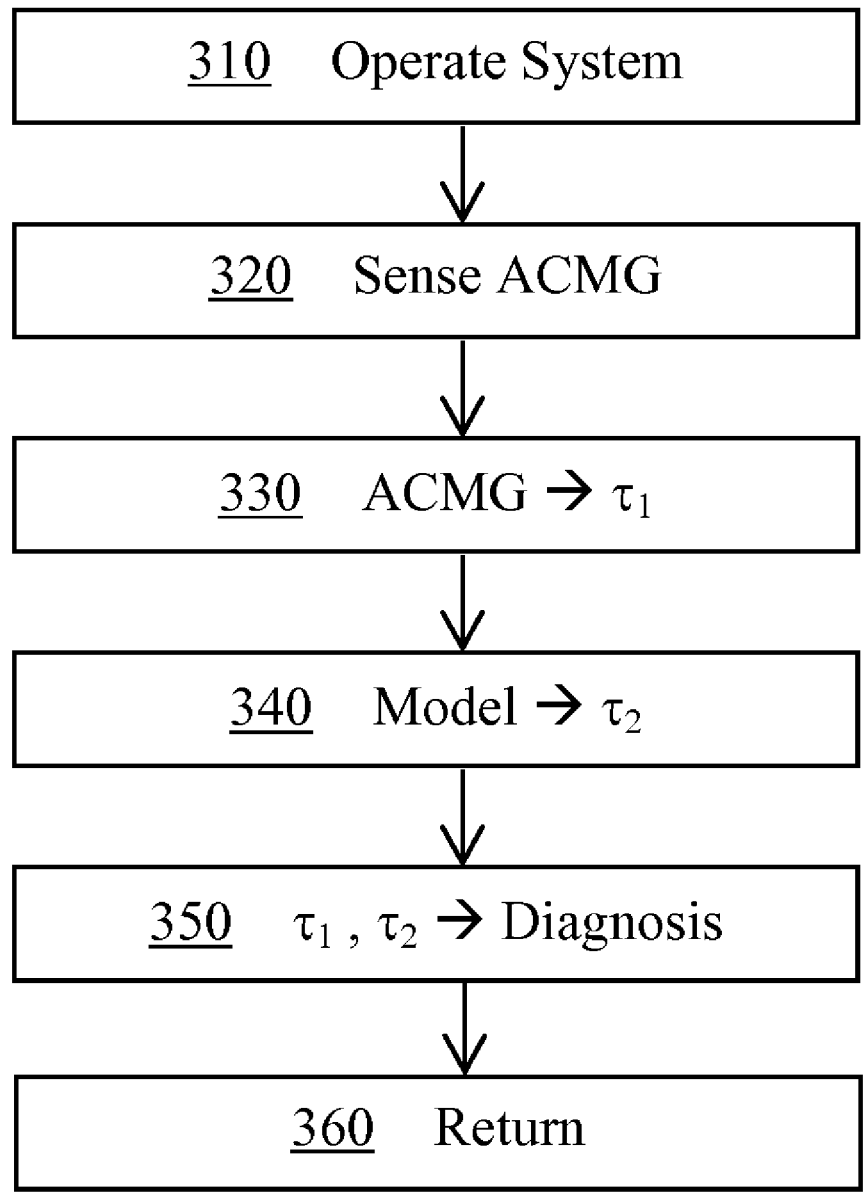
FIG. 3 is a flowchart illustrating an exemplary process.

With reference to FIG. 3 there is illustrated a flowchart according to an exemplary diagnostic process 300 which includes multiple operations that can be performed by a controller such as ECM 130 described above or one or more additional or alternate controllers.

Operation 310 operates a hybrid powertrain system including one or more engine(s) and one or more motor/generator(s). The hybrid powertrain system may be system 100 described above or another hybrid powertrain system. The hybrid powertrain system may have a series configuration, a parallel configuration or a series/parallel configuration, and may operate in a series mode of operation, a parallel mode of operation, a series/parallel mode of operation or may vary among such modes of operation. From operation 310 process 300 proceeds to operation 320.

Operation 320 senses one or more acceleration characteristics of a motor/generator of the hybrid powertrain system. Some embodiments sense one or more of the acceleration characteristics described above. Some embodiments sense other acceleration characteristics. From operation 320 process 300 proceeds to operation 330.

Operation 330 uses one or more sensed acceleration characteristics of the motor/generator to determine a first net torque of the engine of the hybrid powertrain system. Some embodiments determine a first net torque of the engine based upon one or more acceleration characteristics of the motor/generator described above. Some embodiments determine a first net torque of the engine based upon other acceleration characteristics of the motor/generator described above. From operation 330 process 300 proceeds to operation 340.

Operation 340 uses a model to determine a second net torque of the engine of the hybrid powertrain system. Some embodiments determine gross torque based upon fueling information, and determine net torque by accounting for friction losses, pumping losses, cam losses, accessory losses and parasitics. Some embodiments utilize models which account for additional or alternate factors, for example, turbocharger information, engine speed information and others. In the illustrated example operation 340 is performed after operation 330. In other embodiments operation 340 is performed before operation 320, in parallel with operation 320, before operation 330, in parallel with operation 330. From operation 340 process 300 proceeds to operation 350.

Operation 350 diagnoses the system based upon the first net torque, the second net torque. Some embodiments diagnose the system using additional information, for example, vibration characteristics, such as those discussed above. Some embodiments include a four dimensional look up table which includes first net torque values on a first axis, second net torque values on a second axis, and vibration amplitude values on a third axis, vibration frequency values on a fourth axis, and specifies diagnostic conditions for table entries. Some embodiments include look up tables with greater or fewer numbers of axes, for example, a single axis of differences between the first torque values and the second torque values rather than separate axes for first net torque values and second net torque values, or tables which omit one or more of the foregoing four axes or include additional axes with other data values. From operation 350 process 300 proceeds to operation 360 where process 300 returns operation 310, returns to another operation of process 300, or ends. Operation 360 may also call for another process to be performed.

Figure 4:
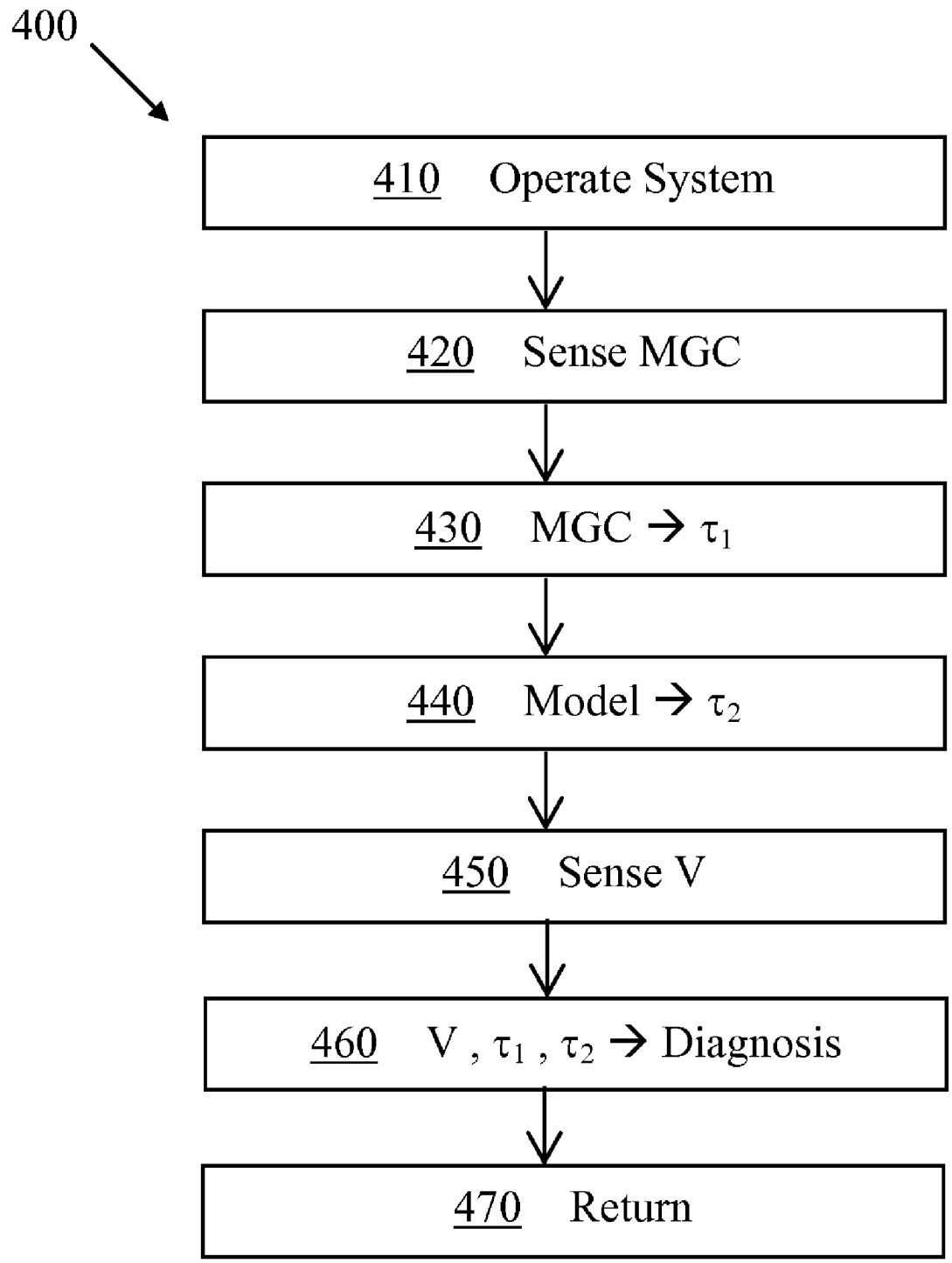
FIG. 4 is a flowchart illustrating an exemplary process.

With reference to FIG. 4 there is illustrated a flowchart according to an exemplary diagnostic process 400 which includes multiple operations that can be performed by a controller such as ECM 130 described above or one or more additional or alternate controllers.

Operation 410 operates a hybrid powertrain system including one or more engine(s) and one or more motor/generator(s). The hybrid powertrain system may be system 100 described above or another hybrid powertrain system. The hybrid powertrain system may have a series configuration, a parallel configuration or a series/parallel configuration, and may operate in a series mode of operation, a parallel mode of operation, a series/parallel mode of operation or may vary among such modes of operation. From operation 410 process 400 proceeds to operation 420.

Operation 420 senses one or more characteristics of a motor/generator of the hybrid powertrain system. Some embodiments sense electrical characteristic(s) of the generator, for example, one or more of the electrical characteristics described above or other electrical characteristics. Some embodiments sense acceleration characteristics of the motor/generator, for example, one or more of the acceleration characteristics described above or other acceleration characteristics. From operation 420 process 400 proceeds to operation 430.

Operation 430 uses one or more sensed characteristics of the motor/generator to determine a first net torque of the engine of the hybrid powertrain system. Some embodiments determine the first net torque based upon an electrical characteristic of the motor/generator based upon one or more of the relationships described above or other relationships an electrical characteristic of the motor/generator and the engine torque. Some embodiments determine the first net torque based upon an acceleration characteristic of the motor/generator based upon one or more of the relationships described above or other relationships an acceleration characteristic of the motor/generator and the engine torque. Some embodiments determine the first net torque based upon another characteristic of the motor/generator. From operation 430 process 400 proceeds to operation 440.

Operation 440 uses a model to determine a second net torque of the engine of the hybrid powertrain system. Some embodiments determine gross torque based upon fueling information, and determine net torque by accounting for friction losses, pumping losses, cam losses, accessory losses and parasitics. Some embodiments utilize models which account for additional or alternate factors, for example, turbocharger information, engine speed information and others. In the illustrated example operation 440 is performed after operation 430. In other embodiments operation 440 is performed before operation 420, in parallel with operation 420, before operation 430, in parallel with operation 430. From operation 440 process 400 proceeds to operation 450.

Operation 450 senses a vibration characteristic of the system. Some embodiments use one or more accelerometer(s) coupled with the engine to measure vibration, amplitude, frequency, or amplitude and frequency. In some embodiments one or more accelerometers are coupled with other system components or at other locations, for example, a motor/generator, a vehicle frame, transmission, mount, support or other structure. In the illustrated embodiment operation 450 is performed after operation 440. In other embodiments operation 450 is performed before operation 420, in parallel with operation 420, before operation 430, in parallel with operation 440, before operation 440 or in parallel with operation 440. From operation 450 process 400 proceeds to operation 460.

Operation 460 diagnoses the system based upon the first net torque, the second net torque and the vibration characteristic. Some embodiments include a four dimensional look up table which includes first net torque values on a first axis, second net torque values on a second axis, and vibration amplitude values on a third axis, vibration frequency values on a fourth axis, and specifies diagnostic conditions for table entries. Some embodiments include look up tables with greater or fewer numbers of axes, for example, a single axis of differences between the first torque values and the second torque values rather than separate axes for first net torque values and second net torque values, or tables which omit one or more of the foregoing four axes or include additional axes with other data values. From operation 460 process 400 proceeds to operation 470 where process 400 returns operation 410, returns to another operation of process 400, or ends. Operation 470 may also call for another process to be performed.

The exemplary embodiments of the invention illustrated and described in detail in the figures and foregoing description are illustrative and not limiting or restrictive. Only the presently preferred exemplary embodiments have been shown and described and all changes and modifications that come within the scope of the invention are to be protected. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a hybrid powertrain system including an engine and a motor/generator;
   determining a first net torque of the engine based upon a model;
   sensing an electrical characteristic of the motor/generator;
   determining a second net torque of the engine based upon the electrical characteristic of the motor/generator; and
   diagnosing the system based upon the first net torque and the second net torque;
   wherein the determining the first net torque and the determining the second net torque utilize at least in part different sources of information.

2. A method according to claim 1 wherein the operating a hybrid powertrain includes operating the engine and the motor/generator in parallel.

3. A method according to claim 1 wherein the electrical characteristic of the motor/generator is a current of the motor/generator.

4. A method according to claim 1 further comprising smoothing torque pulses of the engine with the motor/generator and sensing a vibration of the system during the smoothing; wherein the diagnosing the system based upon the first net torque and the second net torque is further based upon the vibration.

5. A method according to claim 4 wherein the sensing a vibration of the system includes sensing amplitude information and frequency information.

6. A method according to claim 1 wherein the diagnosing includes diagnosing a condition of one or more engine accessories based upon the relationship between the first net torque and the second net torque and an indication of the operational state of said one or more engine accessories.

7. A method according to claim 1 wherein the diagnosing is based upon a difference between the first net torque and the second net torque.

8. A method comprising:
   operating a hybrid powertrain system including an engine and a motor/generator;
   determining a first net torque of the engine based upon a model;
   sensing an acceleration characteristic of the motor/generator;
   determining a second net torque of the engine based upon the acceleration characteristic of the motor/generator; and
   diagnosing the system based upon the first net torque and the second net torque;
   wherein the determining the second net torque of the engine utilizes information from a sensor and the sensor is not utilized in the determining the first net torque of the engine.

9. A method according to claim 8 further comprising operating the hybrid powertrain system in a parallel mode of operation and diagnosing the system based upon the first net torque and the second net torque in the parallel mode of operation.

10. A method according to claim 8 wherein the sensing an acceleration characteristic of the motor/generator is performed at a rate sufficient to determine torque produced by an individual engine firing event.

11. A method according to claim 10 wherein the rate is approximately equal to 2n wherein n is the rotational speed of the engine.

12. A method according to claim 8 wherein the determining a second net torque of the engine based upon the acceleration characteristic of the motor/generator is further based upon information of a vibration of the system.

13. A method according to claim 8 wherein the diagnosing is based upon a relationship of the first net torque to the second net torque.

14. A method comprising:
   operating a hybrid powertrain system including an engine and a motor/generator including using the motor/generator to smooth torque pulses of the engine;
   determining a first net torque of the engine based upon a model;
   sensing a characteristic of the motor/generator;
   determining a second net torque of the engine based upon the characteristic of the motor/generator;
   sensing a vibration characteristic of the system; and
   diagnosing the system based upon the second net torque, the first net torque and the vibration characteristic;
   wherein the determining the first net torque is based at least in part upon information from a source which is not utilized in the determining the second net torque.

15. A method according to claim 14 wherein the characteristic of the motor/generator is an electrical characteristic or an acceleration characteristic.

16. A method according to claim 14 wherein the sensing a vibration characteristic of the system includes measuring vibration amplitude information and frequency information using an accelerometer.

17. A method according to claim 14 wherein the diagnosing the system based upon the second net torque, the first net torque and the vibration characteristic includes identifying a specified error of the system based upon the vibration characteristic.

18. A hybrid powertrain system comprising: an engine; a motor/generator; and a controller; wherein the controller is configured to receive first information of the operating condition of the engine and second information of an electrical characteristic of the motor/generator, the first information being from a different source than the second information, and is operable to process the first information to determine a first net torque of the engine based upon on a model, process the second information to determine a second net torque of the engine, and diagnose an error of the system based upon the first net torque and the second net torque.

19. A system according to claim 18 further comprising a turbocharger operatively coupled with the engine and wherein the first information of the operating condition of the engine includes fueling information, and turbocharger operation information.

20. A system according to claim 18 wherein the second information of the operating condition of the motor/generator includes current and voltage information.

21. A system according to claim 18 wherein the error is an error of operation of one or more engine accessories and the diagnosis is based upon a difference between the second net torque and the first net torque and information of the operational state of the one or more accessories.

22. A system according to claim 18 wherein the engine and the motor/generator are configured in a parallel relationship or a series/parallel relationship.

23. A hybrid powertrain system according to claim 18 wherein the controller is configured to evaluate the first net torque relative to the second net torque and diagnose an error of the system based upon the evaluation.

24. An article of manufacture comprising: a non-transitory computer readable medium configured to store computer executable instructions to receive information from a hybrid powertrain system including an engine and a motor/generator, determine a first net torque of the engine based upon a model, determine a second net torque of the engine based upon information of an electrical characteristic of the motor/generator, and diagnose an error condition of the system based upon the first net torque and the second net torque; wherein the model utilizes information from a source different than the information of the electrical characteristic of the motor generator.

25. An article of manufacture according to claim 24 wherein the computer executable instructions to diagnose an error condition of the system include instructions to diagnose a cylinder misfire, a fueling error, and an engine accessory error.

26. An article of manufacture according to claim 24 further comprising computer executable instructions to selectably control the hybrid powertrain system to operate in a series mode or a parallel mode.

27. An article of manufacture according to claim 24 further comprising computer executable instructions to smooth torque pulses of the engine using the motor/generator and sense vibration of the system; wherein the instructions to diagnose an error condition of the system based upon the first net torque and the second net torque are further based upon the vibration of the system.

28. An article of manufacture according to claim 24 wherein the instructions to diagnose an error condition of the system are based upon a comparison of the first net torque and the second net torque.

* * * * *